United States Patent [19]

Odaka et al.

[11] 4,085,165

[45] Apr. 18, 1978

[54] POLYURETHANE COMPOSITION

[75] Inventors: Fumio Odaka, Kawagoe; Yoshihiko Fujii, Higashi Murayama; Yutaka Iseda, Tachikawa, all of Japan

[73] Assignee: Bridgestone Tire Co., Ltd., Tokyo, Japan

[21] Appl. No.: 536,906

[22] Filed: Dec. 27, 1974

[30] Foreign Application Priority Data

Dec. 29, 1973 Japan .................................. 48-3631

[51] Int. Cl.$^2$ ...................... C08G 18/04; C08L 75/06; C08L 75/08
[52] U.S. Cl. .......................... 260/859 R; 260/77.5 CR
[58] Field of Search ...................... 260/859 R, 77.5 CR

[56] References Cited

U.S. PATENT DOCUMENTS

| | | |
|---|---|---|
| 3,047,530 | 7/1962 | Nisch et al. ................. 260/859 R |
| 3,586,649 | 6/1971 | Cobbledick ................. 260/77.5 CR |
| 3,770,703 | 11/1973 | Gruber et al. ................ 260/859 R |
| 3,782,961 | 1/1974 | Takahashi et al. .............. 204/159.15 |
| 3,824,201 | 7/1974 | McGranaghan et al. ....... 260/859 R |
| 3,834,578 | 9/1974 | Smith et al. .................... 260/859 R |
| 3,855,177 | 12/1974 | Sanda, Jr. ..................... 260/77.5 CR |
| 3,864,133 | 2/1975 | Hisamatsu et al. ............. 204/159.19 |

*Primary Examiner*—Murray Tillman
*Assistant Examiner*—Thurman K. Page
*Attorney, Agent, or Firm*—Brooks, Haidt, Haffner & Delahunty

[57] ABSTRACT

A polyurethane composition is produced by mixing (a) 100 parts by weight of prepolymer having terminal isocyanate groups and having a number average molecular weight in the range of from 800 to 20,000, (b) 5 – 30 parts by weight of a radical polymerizable vinyl compound, and (c) 0.05 – 1.0 part by weight of a radical initiator, adding (d) a curative selected from the group consisting of polyamine and polyol, and curing the resulting mixture by heating at 70 – 140° C, the equivalent ratio of the active hydrogen of (d) to the isocyanate groups of (a) being in the range of from 0.8 to 1.2.

17 Claims, No Drawings

POLYURETHANE COMPOSITION

BACKGROUND OF THE INVENTION

1. Field of the Invention

The present invention relates to an improved polyurethane composition, and more particularly to a polyurethane composition exhibiting excellent skid resistance under wet conditions and creep resistance.

2. Description of the Prior Art

Heretofore, polyurethane has been widely used since it is excellent in mechanical properties and wear resistance and further it is transparent and capable of being cast to give a desired shape. Recently, attempts have been made to use the polyurethane as the material of a tire, various industrial articles and the like.

However, polyurethane has been disadvantageously deficient in skid resistance under wet conditions, tear resistance and creep resistance, and therefore improvemennt in this respect has been highly required. Various monomers and catalysts have been added in order to improve such polyurethane resin, but in each case, there has not been found any polyurethane composition which is excellent in elasticity and mechanical properties and improved particularly in skid resistance under wet conditions and in tear resistance.

SUMMARY OF THE INVENTION

It is an object of the present invention to provide a polyurethane composition free from the above-mentioned drawbacks.

It is another object of the present invention to provide a polyurethane composition which is excellent in skid resistance under wet conditions, tear resistance and creep resistance.

It is a further object of the present invention to provide a polyurethane composition exhibiting excellent skid resistance under wet conditions, tear resistance and creep resistance, in addition to the same mechanical properties and processability as those of a conventional polyurethane elastic body.

It is still another object of the present invention to provide a polyurethane composition having balanced mechanical properties.

It is a still further object of the present invention to provide a polyurethane composition which is produced at a low cost and is always constant in its mechanical properties.

According to an aspect of the present invention, there is provided a polyurethne composition produced by mixing (a) 100 parts by weight of prepolymer having terminal isocyanate groups and having a number average molecular weight in the range of from 800 to 20,000, (b) 5 - 30 parts by weight of a radical polymerizable vinyl compound, and (c) 0.05 - 1.0 part by weight of a radical initiator, adding (d) a curative selected from the group consisting of polyamine and polyol, and curing the resulting mixture by heating at 70 - 140° C, the equivalent ratio of the active hydrogen of (d) to the isocyanate groups of (a) being in the range of from 0.8 to 1.2.

According to another aspect of the present invention, there is provided a polyurethane composition produced by mixing (a) 100 parts by weight of prepolymer having terminal isocyanate groups and having a number average molecular weight in the range of from 800 to 20,000, (b) 5 - 30 parts by weight of a radical polymerizable vinyl compound, and (c) 0.05 - 1.0 part by weight of a radical initiator, adding (d) a curative selected from the group consisting of polyamine and polyol, and at least one of (e) less than 1.0 part by weight for the an accelerator of chain extending reaction and (f) a compound having both a vinyl group and a functional group containing an active hydrogen, and curing the resulting mixture by heating at 70° - 140° C, the equivalent ratio of the total active hydrogen of (d) and (f) to the isocyanate groups of (a) being in the range of from 0.8 to 1.2 and the equivalent ratio of the active hydrogen of the component (d) to that of the component (f) being in the range of from 3 to 25.

DESCRIPTION OF THE PREFERRED EMBODIMENTS

Component (a) of the polyurethane composition according to the present invention is a prepolymer selected from the group consisting of polyether, polyester and polyunsaturated hydrocarbon, each of which has terminal isocyanate groups. The prepolymer to be used in the present invention may be prepared by the well-known methods, for example, by reacting an excess of an organic polyisocyanate with a compound such as a polyether polyol, polyester polyol, polydiene polyol and analogues thereof, each of which has at least one active hydrogen at the chain terminal. The number average molecular weight of the prepolymer ranges from 800 to 20,000, preferably 2,000 to 5,000. The above-mentioned prepolymer may be one having a functionality of 1 - 3, preferably 2.

The polyether, polyester and polyunsaturated hydrocarbon, each of which has at least one active hydrocarbon at the chain terminal are those having at least one terminal functional group containing at least one active hydrogen which can react with the isocyanate group, for example, a hydroxyl group, amino group, imino group, carboxyl group or mercapto group.

As representative polyethers having at least one active hydrogen at its chain terminal, there may be mentioned a polyalkylene oxide such as polyethylene oxide, polypropylene oxide, polybutylene oxide, polyamylene oxide and the derivatives thereof, a polyepihalohydrin such as polyepichlorohydrin and the like, a polystyrene oxide, a polyhydric polyalkylene ether such as polyoxytetramethylene glycol and the like, a polyacetal produced by the condensation of butanedioxyethyl glycol or diethylene glycol with formaldehyde, a polyoxyalkylene triol such as polyoxypropylene triol and the like, a polyoxyalkylene dicarboxylic acid, a polyoxyalkylene dithiol, a polyoxyalkylene diamine and a polymer polyol produced by chain extending a polyether as described above with a diisocyanate compound.

Among them, a polyhydric polyalkylene ether is preferable, and polyoxytetramethylene glycol or its chain pre-extended product is particularly preferable.

As polyesters having terminal active hydrogen, there may be used hydroxypolyesters obtained by reacting polybasic carboxyl acids such as oxalic acid, malonic acid, succinic acid, glutaric acid, adipic acid, pimelic acid, cork acid, azelaic acid, sebacic acid, brassylic acid, fumaric acid, glutamic acid, α-hydromuconic acid, β-hydromuconic acid, α-butyl-α-ethyl-glutaric acid, α, β-diethyl succinic acid, phthalic acid, isophthalic acid, terephthalic acid, 1,4-cyclohexane dicarboxylic acid, 1,3,5-benzene tricarboxylic acid and their analogues with polyols such as ethylene glycol, propylene glycol, propane-1,2-diol, propane-1,3-diol, allyloxy propanediol, butane-1,4-diol, butane-1,3-diol, butane-2,3-diol, butane-2,4-diol, butane-dioxyethyl glycol, butene-1,4-diol, butyne-1,4-diol, pentane-1,4-diol, pentane-1,5-diol, hexane-1,6- diol, decane-1,10-diol, dodecane-1,12-diol, octadecane-7,18-diol, 4,4'-dihydroxy dicyclohexyl methane, 4,4'-dihydroxy dicyclohexyl dimethyl methane, bis-2-hydroxyethyl terephthalate, xylylene glycol, glycerine, castor oil, trimethylol propane, hexane-1,2,6-triol, hexane-1,3,6-triol, pentaerythritol, sorbitol, mannitol, sugar, hydroquinone, 4,4'-dihydroxy diphenyl methane, 4,4'-dihydroxy diphenyl dimethyl methane resorcinol, thiodiglycol and a glycol of the formula

where n is 1 – 4,
and their analogues and mixtures.

Preferably there are used dihydroxypolyethylene adipate and dihydroxypoly(ethylene glycol/propylene glycol) adipate.

The term hydroxy polyester, includes polyhydroxy polyesteramide obtained by adding an organic amine such as ethylenediamine, propylenediamine, ethanolamine and their analogues or an aminoalcohol to the above mentioned components. Moreover, polyesterether glycol such as hydroxypolyester, polydiethylene adipate and the like of lactone series and lactone copolymer series may be used.

As an unsaturated hydrocarbon having at least terminal active hydrogen, there may be used polybutadiene glycol, styrenebutadiene copolymer glycol, acrylonitrile-butadiene copolymer glycol and the like.

As organic isocyanates used to react with the above described active hydrogen, there may be used aliphatic diisocyanates such as ethane diisocyanate, propane diisocyanate, butene diisocyanate, butane diisocyanate, pentane diisocyanate, β-methylbutane diisocyanate, hexane diisocyanate, ω, ω'-dipropylether diisocyanate, heptane diisocyanate, 2,2-dimethyl pentane diisocyanate, 3-methoxy hexane diisocyanate, octane diisocyanate, 2,2,4-trimethyl pentane diisocyanate, nonane diisocyanate, decame diisocyanate, 3-butoxy hexane diisocyanate, 1,4-butylene glycol dipropyl ether-ω, ω'-diisocyanate, undecane diisocyanate, dodecane diisocyanate, dimer acid diisocyanate, trans vinylene diisocyanate, lysine diisocyanate methyl ester, 1,3- and 1,4-xylene diisocyanate, trimethyl hexa methylene diisocyanate, ω, ω'-diisocyanate-1,4-diethyl benzene, ω,ω'-diisocyanate-1,4-dimethyl naphthalene, ω,ω'-diisocyanate-1,5-dimethyl naphthalene, ω,ω'-diisocyanate-n-propylbiphenyl and their mixtures, alicyclic diisocyanates such as, ω,ω'-diisocyanate-1,2-dimethylcyclohexane, 1-methylcyclohexane-2,4-diisocyanate, decaline-1,5-diisocyanate, ω,ω'diisocyanate-1,4-dimethylcyclohexane, 1-ω-methyl isocyanate-2-ω-n-propyl isocyanate-3,5-dimethylcyclohexane, 1,3- and 1,4-cyclohexyl diisocyanate, methylene-bis-(4-cyclohexyl isocyanate), isophorone diisocyanate and their mixtures, aromatic diisocyanates such as tolylene-2,4-diisocyanate, tolylene-2,6-diisocyanate, tolylene-2,5-diisocyanate, tolylene-3,5-diisocyanate, toluidine diisocyanate, 1,3-dimethyl benzene-2,4-diisocyanate, 1,3-dimethyl benzene-4,6-diisocyanate, 1,4-dimethylbenzene-2,5-diisocyanate, 1-ethylbenzene-2,4-diisocyanate, 1-isopropylbenzole-2,4-diisocyanate, diethylbenzene diisocyanate, diisopropylbenzole diisocyanate, metaphenylene diisocyanate, paraphenylene diisocyanate, 1,4-, 1,5-, 1,6- and 2,7-naphthalene diisocyanate, 1,1'-dinaphthyl-2,2'-diisocyanate, 2,4'-and -4,4'-biphenyl diisocyanate, diphenyl methane-4,4'-diisocyanate, diphenyl dimethyl methane-4,4'-diisocyanate, cyclohexyldi(4-isocyanatophenyl)methane, 3,3'-and 4,4'-benzophenone diisocyanate, α, β-diphenylethane-2,4-diisocyanate, 3-nitro triphenyl methane-4,4'-diisocyanate, 4-nitro triphenyl methane-4,4'-diisocyanate, diphenyl ether-4,4'-diisocyanate, diphenyl sulfide-4,4'-diisocyanate, stilbene-4,4'-diisocyanate, dibenzyl-4,4'-diisocyanate, diphenyl isopropylidene-4,4'-diisocyanate and alkyl, alkoxy, halogen or nitro substituted derivatives thereof such as 3,3'-dimethyl biphenyl-4,4'-diisocyanate, 3,3'-dimethoxy biphenyl-4,4'-diisocyanate, 2-nitro biphenyl-4,4'-diisocyanate, dichloro biphenyl-4,4'-diisocyanate, 3,3'-dimethyl diphenyl methane-4,4'-diisocyanate, 2,5,2',5'-tetramethyl diphenyl methane-4,4'-diisocyanate, 3,3'-dimethoxy diphenyl methane-4,4'-diisocyanate, 4,4'-dimethoxy phenyl methane-3,3'-diisocyanate, 4,4'-diethoxy diphenyl methane-3,3'-diisocyanate, 2,2'-dimethyl-5,5'-dimethoxy diphenyl methane-4,4'-diisocyanate, 3,3'-dichloro diphenyl dimethyl methane-4,4'-diisocyanate, 3,3'-dichloro diphenyl methane-4,4'-diisocyanate and their mixtures, and polyisocyanates such as 1-methyl benzene-2,4,6-triisocyanate, 1,3,5-trimethylbenzene-2,4,6-triisocyanate naphthalene-1,3,7-triisocyanate, biphenyl-2,4,4'-triisocyanate, diphenyl methane-2,4,4'-triisocyanate, 3-methyl diphenyl methane-4,6,4'-triisocyanate, triphenyl methane-4,4',4''-triisocyanate, diphenyl ether-2,4,4'-triisocyanate, dicyclo hexyl methane-2,4,4'-triisocyanate, polymethylenepolyphenyl isocyanate having the formula

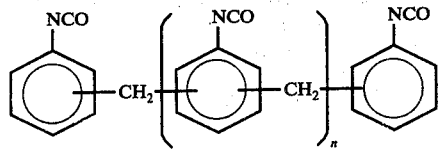

where n is 1 – 6, and their mixtures.

Among them, tolylene-2,4-diisocyanate, tolylene-2,6-diisocyanate, 1,5-naphthalene diisocyanate, diphenyl-4,4'-diisocyanate, 3,3'-dimethyl biphenyl-4,4'-diisocyanate, diphenylmethane-4,4'-diisocyanate, hexane diisocyanate, cyclohexyl-1,3- and -1,4-diisocyanate, methylene bis(4-cyclohexyl isocyanate), 1,3- and 1,4-xylene diisocyanate, 1-methylcyclohexane-2,4-diisocyanate, decaline-1,5-diisocyanate, tolidine diisocyanate and their mixtures are preferable.

As radical polymerizable vinyl compounds of component (b) in the present invention, there may be used vinyl acetate, acrylonitrile, styrene, substituted styrene monomers such as α-methyl styrene, β-methyl styrene, o-methyl styrene, m-methyl styrene, p-methyl styrene, α,β-dimethyl styrene, β,β'-dimethyl styrene, 2,4-dimethyl styrene, 2,5-dimethyl styrene, 3,4-dimethyl styrene, 3,5-dimethyl styrene, α,o-dimethyl styrene, α,m-dimethyl styrene, α,p-dimethyl styrene, α,β,β'-trimethyl styrene, 2,4,6-trimethyl styrene, 2,4,5-trimethyl styrene, α,2,3-trimethyl styrene, α, 3,4-trimethyl styrene, α-ethyl styrene, ethylvinyl benzene, β,β'-dimethyl-α-ethyl styrene, β,β'-diethyl styrene, 2,5-diethyl styrene, 3,5-diethyl styrene, 3,4-diethyl styrene, p-isopropyl styrene, β-isopropyl styrene, p-n-butyl styrene, m-sec-butyl styrene, m-t-butyl styrene, p-t-butyl styrene, p-n-heptyl styrene, p-cyclohexyl styrene, α-phenyl styrene, β-phenyl styrene, o-phenyl styrene, m-phenyl styrene, p-phenyl-styrene, p-benzyl styrene, o-fluoro styrene, m-fluoro styrene, p-fluoro styrene, α-methyl-p-fluoro styrene, α,4-dimethyl-3-fluoro styrene, α-chloro-β-fluoro styrene, α,β-difluro styrene, β,β'-difluoro styrene, α,β,β'-trifluoro styrene, m-trifluoro styrene, p-trifluoromethyl styrene, α-methyl-m-trifluoromethyl styrene, β-methyl-m-trifluoromethyl styrene, 4-fluoro-3-trifluoromethyl styrene, α-methyl-4-fluoro-3-trifluoro styrene, 2,5-di-(trifluoromethyl) styrene, α-chloro styrene, β-chloro styrene, o-chloro styrene, m-chloro styrene, p-chloro styrene, o-chloro-α-methyl styrene, m-chloro-α-methyl styrene, p-chloro-α-methyl styrene, α-chloro-p-methyl styrene, α-chloro-2,4-dimethyl styrene, 3-chloro-α,2-dimethyl styrene, 3-chloro-α,4-dimethyl styrene, α-chloro-2,4,6-trimethyl styrene, α-chloro-2,3,4,6-tetramethyl styrene, β-chloro-p-methyl-α-ethyl styrene, 2,5-dichloro styrene, 2,3-dichloro styrene, 2,4-dichloro styrene, 2,6-dichloro styrene, 3,4-dichloro styrene, 3,5-dichloro styrene, α,β-dichloro styrene, β,β'-dichloro styrene, α-p-dichloro styrene, 2,5-dichloro-α-methyl styrene, 3,4-dichloro-α-methyl styrene, α,β-dichloro-p-methyl styrene, β,β'-dichloro-p-methyl styrene, α,β,β'-trichloro styrene, tetrachloro styrene, pentachloro styrene, o-bromo styrene, m-bromo styrene, p-bromo styrene, m-bromo-α-methyl styrene, p-bromo-α-methyl styrene, 3-bromo-α,2-dimethyl styrene, 3-bromo-α,4-dimethyl styrene, 2-bromo-4-trifluoro methyl styrene, 4-bromo-3-trifluoro methyl styrene, m-iodo styrene, p-iodo styrene, β-bromo-α,β-diiodo styrene, α,β,β'-triiodo styrene, β-methoxy styrene, o-methoxy styrene, m-methoxy styrene, p-methoxy styrene, α-methyl-p-methoxy styrene, β-methyl-o-methoxy styrene, 2-methyl-3-methoxy styrene, 3-methyl-2-methoxy styrene, 3-methyl-4-methoxy styrene, 3-methyl-6-methoxy styrene, 5-methyl-2-methoxy styrene, 2,6-dimethoxy styrene, 3,4-dimethoxy styrene, o-ethoxy styrene, p-ethoxy styrene, o-phenoxy styrene, p-phenoxy styrene, o-nitro styrene, m-nitro styrene, p-nitro styrene, β-nitro styrene, α-chloro-p-nitro styrene, β-chloro-o-nitro styrene, m-chloro-β-nitro styrene, m,β-dinitro styrene, p,β-dinitro styrene, o-cyano styrene, m-cyano styrene, p-cyano styrene, p-cyano-α-methyl styrene, p-vinyl benzoic acid, cis-cinnamic acid, trans-cinnamic acid, methyl p-vinyl benzoate, α-acetoxy styrene, β-acetoxy styrene, o-acetoxy styrene, p-acetoxy styrene, m-formyl styrene, p-formyl styrene, p-vinyl benzyl acetate, indene and the like, monovinyl compounds, for example, methacrylates such as methyl methacrylate, ethyl methacrylate, β-chloroethyl methacrylate, β-methoxyethyl methacrylate, n-propyl methacrylate, isopropyl methacrylate, 2-propane-1-methacrylate, n-butyl methacrylate, isobutyl methacrylate, sec-butyl methacrylate, t-butyl methacrylate, 2-butanone-1-methacrylate, methyllactate methacrylate, n-amyl methacrylate, isoamyl methacrylate, t-amyl methacrylate, furfuryl methacrylate, tetrahydro furfuryl methacrylate, cyclohexyl methacrylate, n-hexyl methacrylate, phenyl methacrylate, o-cresyl methacrylate, m-cresyl methacrylate, benzyl methacrylate, o-chlorobenzyl methacrylate, n-butyllactate methacrylate, n-octyl methacrylate, α-naphthyl methacrylate, β-naphthyl methacrylate, n-lauryl methacrylate, 2-ethyl hexyl methacrylate, tridecyl methacrylate, stearyl methacrylate, glycidyl methacrylate, and the like, divinyl compounds such as 3,9-divinyl-2,4,8,10-ttetraoxaspiro[5,5]undecane, ethylene glycol dimethacrylate, 1,3-butylene-dimethacrylate, triethylene glycol dimethacrylate, tetraethylene glycol dimethacrylate, ethylidene dimethacrylate, 1,4-cyclohexylidene dimethacrylate, hexamethylene glycol dimethacrylate, divinyl benzene, vinyl methacrylate, and the like, allyl compounds such as allyl methacrylate, α-methallyl methacrylate, β-methallyl methacrylate, diallyl phthalate, triallyl cyanurate, and trimethylol propane trimethacrylate and pentaerythritol tetramethacrylate and their mixtures.

Among them, there may be preferably used aromatic vinyl compounds such as ethyl vinyl benzene, divinyl benzene, and methyl methacrylate, vinyl acetate, ethylene glycol dimethacrylate and 1,3-butylene dimethacrylate.

As radical initiators, component (c) in the present invention, there may be used 1,1'-bis-t-butyl penoxy-3,3,5-trimethyl cyclohexane, benzoyl peroxide, t-butyl peroxybenzoate, t-butyl peroxy-2-ethyl hexanoate, lauroyl peroxide, azo-bis-isobutyronitrile, decanoyl peroxide, propionyl peroxide, succinic acid peroxide, acetyl peroxide, t-butyl peroxy isobutyrate, t-butyl peroxymaleic acid, t-butyl peroxylaurate, cyclohexanone peroxide, t-butyl peroxyisopropyl carbonate, 2,5-dimethyl-2,5-di(2-ethylhexyl peroxy)hexane, t-butyl peroxy acetate and the like. Among them, t-butyl peroxy benzoate, t-butyl peroxy-2-ethyl-hexanoate and 1,1'-bis-t-butyl peroxy-3,3,5-trimethyl cyclohexane are preferable, and the compounds having the half life of ten hours at 60° to 100° C are preferable.

As component (d) in the present invention, a curative selected from polyamines and polyols may be used.

As the polyamine, there may be used 4,4'-methylene bis(ortho-chloroaniline), methylene dianiline, methylene bis-2-methoxyaniline, 2,2,5-trichloro-4,4'-methylene dianiline, o-phenylenediamine, m-phenylene diamine, p-phenylene diamine, 2,6-dichloro-p-phenylene diamine, tolylene-2,4-diamine, toluidine, dianisidine, diphenylether-4,4'-diamine, 4,4'-diphenyl diamino-sulfone, 3,3'-diphenyl diamino sulfone, naphthalene-1,5-diamine, aromatic diamines represented by the formula:

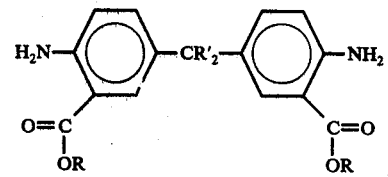

wherein R represents a radical selected from the class of $-CH_3$, $-C_2H_5$, $-C_3H_9$, $-C_6H_{13}$, $-C_8H_{17}$,

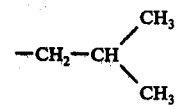

and $-CH(CH_3)-(CH_2)_3-CH_3$ and R' represents a radical selected from the group of $-H$, $-CH_3$, $-C_4H_9$ and $-C_6H_{13}$, aromatic diamines represented by the formula:

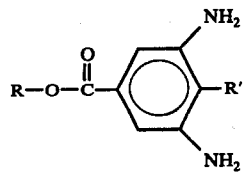

wherein R represents a radical selected from the group of —CH₃, —C₂H₅, —C₃H₇, —nC₄H₉, —iC₄H₉, —(CH₂)₂—OCH₃,

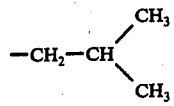

—C₁₈H₃₇ and —CH₂—CH(C₂H₅)—(CH₂)₃—CH₃ and R' represents a radical selected from the group of —CH₃, —C₂H₅, —C₃H₇, —iC₄H₉ and halogen, and aromatic diamines such as 2,4-diamino cumene, m--tolylene diamine, p-chloroo-phenylene diamine, o-chloro-p-phenylene diamine, and their analogues and mixtures and aliphatic polyamines such as hydrazine, ethylene diamine, trimethylene diamine, diethylene triamine, hexamethylene-1,6-diamine, propylene diamine and their mixtures. As the polyol, there may be used ethylene glycol, propylene glycol, propane-1,2-diol, propane-1,3-diol, allyloxypropane-diol, butane-1,4-diol, butane-1,3-diol, butane-2,3-diol, butane-2,4-diol, butane dioxyethyl glycol, butene-1,4 diol, butyne-1,4-diol, pentane-1,4-diol, pentane-1,5-diol, hexane-1,6-diol, decane -1,10-diol, dodecane-1, 12-diol, octadecane-7,18-diol, 4,4'-dihydroxy dicyclohexyl methane, 4,4'-dihydroxy dicyclohexyl dimethyl methane, bis-2-hydroxyethyl terephthalate, xylylene glycol, glycerine, castor oil, trimethylol propane, hexane-1,2,6-triol, hexane-1,3,6-triol, pentaerythritol, sorbitol, mannitor, sugar, hydroquinone, 4,4'-dihydroxy diphenylmethane, 4, 4'-dihydroxy diphenyl dimethyl methane, resorcinol, thiodiglycol, glycol represened by the formula.

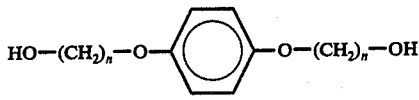

wherein n is from 1 to 4, their analogues and mixtures. Among them, methylene bis(ortho-chloroaniline), methylene dianiline, naphthalene-1,5-diamine, phenylene diamine, tolylene2,4-diamine, diphenylether-4, 4'-diamine, hydrazine, ethylene diamine, 2,6-dichlorophenylene diamine, hexamethylene-1,6-diamine, compounds represented by the formula.

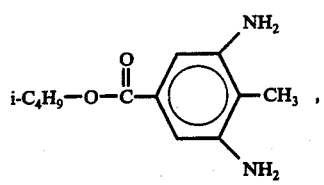

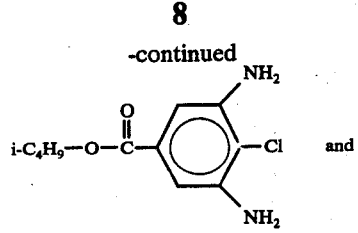

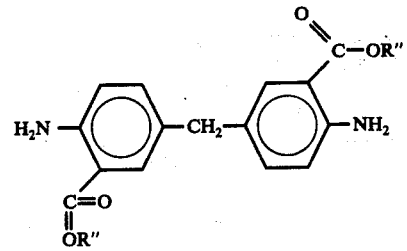

wherein R" is a radical selcted from the group of —CH₃, —C₂H₅, —C₃H₇ and —C₄H₉, ethylene glycol 1,3-propylene glycol, 1,4-butane diol, trimethylolpropane, a compound represented by the formula,

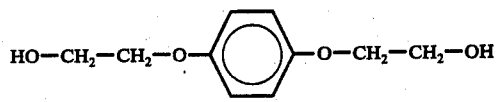

and their mixtures are preferable.

The curatives selected from the class of the aromatic polyamine and the aromatic polyols are particularly preferable. As component (f) to be used in the present invention, there may be used a compound having both of vinyl group and funtional group containing active hydrogen such as 2-hydroxyethyl methacrylate, 2-hydroxypropyl methacrylate, aminostyrene, p-vinyl benzyl alcohol, hydroxystyrene, N-methylol acrylamide and methacrylic acid.

As accelerators of the chain extending reaction, component (e), in the present invention, there may be used carboxylic acids and their anhydrides such as adipic acid, acetic acid, oleic acid, benzoic acid, 2-methyl benzoic acid, 3-methyl benzoic acid, 4-methyl benzoic acid, 2,3-dimethyl benzoic acid, 2,4-dimethyl benzoic acid, 3,4dimethyl benzoic acid, 3,5-dimethyl benzoic acid, 2,4,6-trimethyl benzoic acid, 2,3,4-trimethyl benzoic acid, 2,3,5-trimethyl benzoic acid, 3,4,5-trimethyl benzoic acid and the above mentioned methyl substituted benzoic acid derivatives in which all or a part of the methyl groups is replaced by ethyl, n-propyl, i-propul, n-butyl, i-butyl, t-butyl, merthoxy, ethoxy or propoxy, carboxylic acids or anhydrides such as glutaric acid, pimelic acid, azelaic acid, propionic acid, valeric acid, caproic acid, caprylic acid, myristic acid, palmitic acid, stearic acid and their analogues, stearic acid anhydride, phthalic acid anhydride and their analogues, di-n-butyl tin dilaurate, stannous octoate, and tertiary amines such as triethylene diamine, dimethyldecylamine, N-ethyl morpholine and their analogues.

Among them, 2-methyl benzoic acid, 3-methyl benzoic acid, 4-methyl benzoic acid, 3,5-dimethyl acetic acid, 2-ethoxy benzoic acid, 3,4,5-trimethyl benzoic acid and azelaic acid are preferable.

The mixing ratios of components (a), (b), (c) and (d) are as follows. The amount of component (b) is 5- 30 parts by weight per 100 parts by weight of component (a), preferably 5 - 15 parts by weight. The amount of component (c) is 0.05 –1.0 parts by weight per 100 parts by weight of component (a), preferably 0.1 – 0.4 parts by weight. The equivalent ratio of the active hydrogen of component (d) to the isocyanate groups of component (a) is 0.8 – 1.2.

The present invention may be accomplished without using component (f). However, when a proper amount of component (f) is used together with component (d), creep resistance of the resulting product can be appreciably improved. The amount of component (f) may be from 5 to 15 parts by weight. When component (f) is used together with component (d), the equivalent ratio of the total active hydrogen of component (d) and component (f) tO the isocyanate group of component (a) ranges from 0.8 to 1.2. In this case, the equivalent ratio of the active hydrogen of component (d) to that of component (f) ranges from 3to 25.

When the equivalent ratio of component (d) to component (f) is less than 3, the physical properties of the resulting product may be lowered. When said equivalent ratio is more than 25, the creep resistance of the resulting product may be hardly kept at a satisfactory value. The amount of component (e), if used, is less than 1.0 part by weight per 100 parts by weight of component (a), preferably 01. –0.3 part by weight.

When component (b) of less than 5 parts by weight is added, high skid resistance under wet conditions may not be obtained and even when component (b) of more than 30 parts by weight is added, skid resistance under wet conditions may not be further improved, and physical properties such as mechanical strength, rubber elasticity and creep resistance may be lowered. When component (c) of less thabn 0.05 parts by weight is added, radical polymerization does not proceed sufficiently and the physical properties are lower. When component (c) of more than 1.0 part by weight is added, a rate of radical polymerization is so high that physical properties are deteriorated.

The use of component (e) may not be necessary, but physical properties may be improved by the use thereof.

The mixing method is as follows.

To component (a) are generally added components (b) and (c) at 60° C below to defoam, and then components (d), (e) and (f) are added respectively to mix uniformly at a liquid state and the resulting mixture is molded. A mixing method should not be limited to the above described method. Each component may be added in any order or simultaneously. The use of a solvent may not be necessary, but if necessary it may be added. The atmosphere is preferably dry air or a dry inert gas. The curing reaction may be completed by the reaction at 70°–140° C, preferably 90 – 130° C, for from 15 minutes to 24 hours. The cure condition is determined by the combination of components (a) – (e) and the amount relation among them. In order to obtain a product of the improved physical properties, it is important in the reaction of the present invention to carry out the chain extending reaction before the radical polymerizing reaction.

The thus obtained polyurethane composition exhibits extremely improved skid resistance under wet conditions and creep resistanc, in addition to the usual physical properties and processability similar to those of a conventional polyurethane elastic body as shown in the examples below, and it has balanced mechanical properties and is useful for industrial materials. Moreover, it is produced at a low cost. These properties were measured by the following methods.

The skid resistance under wet conditions was estimated as the skid resistance value (SR) of the resulting product which is meausred by a portable skid resistance tester (manufactured by Stanley Co., Ltd., England) on the wet surface of the Safety Walk (manufactured by 3M Co., U.S.A.) at room temperature. The larger the value is, the higher the skid resistance is. The SR obtained by the above method may be corresponding to the skid resistance under wet conditions of a tire for a car. (cf. C. G. Gilos, B. E. Sabey, K. H. F. Cardew: Rubber Chemistry and Technology. 38, 840 (1965).

Mechanical properties are measured by Tensilon Tester UTM-Type 1 (trademark of a tensile tester, manufactured by Toyo Baldwin Co. Ltd. and a creep tester. The values measures are Young's Modulus calculated by multiplying 10% modulus by ten, tensile strength at break (Tb), elongation at break (EB), tear energy in cut ($\Gamma$), stress concentration factor (m$\gamma$), creep at 100° C under the load of 20 kg/cm$^2$ ($\Delta\epsilon$). The larger Tb, Eb and $\Gamma$ are, the better these properties are, and the smaller m$\gamma$ and $\Delta\epsilon$ are, the better those properties are.

The following examples are intended to illustrate the invention and are not to be construed to limit the scope of the invention.

The following examples are given for the purpose of illustration and not by way of limitation. The parts, ratios and percents are by weight unless otherwise indicated.

EXAMPLE 1

One hundred parts of a prepolymer, in which the main chain structure was polyethylene adipate having a number average molecular weight of 2330 and in which the terminal groups were tolylene diisocyanate groups, 12.4 parts of a mixture of divinyl benzene and ethylvinyl benzene (60: 40), and 0.24 parts of t-butylperoxy-2-ethyl hexanoate were mixed and defoamed with stirring at 60° C.

To the resulting mixture was added 4,4'-methylene-bis (ortho-chloroaniline)(hereinafter called "MOCA") at an equivalent ratio of amino group of MOCA to isocyanate group of the prepolymer (hereinafter called "NH$_2$/NCO ratio") of 1.1, mixed, cast into a slab mold, and cured at 100° C for 3 hours.

Physical properties at room temperature and creep of the resulting elastomeric specimen are shown in Table 1.

EXAMPLE 2

An elastomeric polyurethane composition was prepared by repeating the procedure of Example 1 except that 0.12 parts of 1,1'-bis-t-butylperoxy-3,3,5-trimethyl-cyclohexane was used instead of t-butylperoxy-2-ethyl hexanoate, the NH$_2$/NCO equivalent ratio was 1.0 and the curing was conducted at 120°C for 3 hours.

Physical properties at room temperature and creep of the resulting specimen are shown in Table 1.

COMPARATIVE EXAMPLE 1

A polyurethane composition was prepared by repeating the procedure of Example 1 except that neither vinyl monomer nor radical initiator was used, the NH$_2$/NCO equivalent ratio was 1.0 and curing was effected at 100° C for 24 hours.

Physical properties at room temperature and creep at 100° C of the resulting composition are shown in Table 1.

Table 1

| Example and Comparative Example | Physical properties | SR under wet conditions | $E_{10}$ (kg/cm$^2$) | Tb (kg/cm$^2$) | Eb (%) | Γ (kg/cm) | Mγ (1/cm) | Δε (%) |
|---|---|---|---|---|---|---|---|---|
| Example 1 | | 83 | 295 | 320 | 530 | 54 | 13 | 4.8 |
| Example 2 | | 83 | 225 | 392 | 555 | 48 | 12 | 3.9 |
| Comparative Example 1 | | 75 | 241 | 361 | 671 | — | — | 7.0 |

It is clear from Table 1 that the specimens obtained by the present invention are superior in SR under wet conditions to and are similar to or better in the other physical properties than those of ordinary polyester urethane (Comparative Example 1).

EXAMPLE 3

100 parts of prepolymer, in which the main chain structure was polyoxy tetramethylene glycol having a number average molecular weight of 2070 and the terminal groups were tolylene diisocyanate groups, 12.7 parts of a mixture of divinyl benzene and ethyl vinyl benzene (60 : 40) and 0.25 parts of t-butylperoxybenzoate were mixed and defoamed with stirring at 60° C. Then, MOCA in a melted state was admixed with said mixture at the equivalent ratio (NH$_2$/NCO) of 1.1. The resulting composition was cast into a slab mold and cured at 100° C for 2 hours and further at 140° C for one hour to obtain an elastomeric specimen.

The physical properties at room temperature are shown in Table 2.

COMPARATIVE EXAMPLE 2

100 parts of a prepolymer, in which the main structure was polyoxy tetramethylene glycol having a number average molecular weight of 2070 and the terminal groups were tolylene diisocyanate groups and a melted MOCA were mixed at the equivalent ratio (NH$_2$/NCO) of 1.0 and cured at 100° C for 3 hours to produce an ordinary polyether urethane specimen. Physical properties at room temperature of said specimen are shown in Table 2.

COMPARATIVE EXAMPLE 3

A polyether urethane specimen was prepared by repeating the procedure of Comparative Example 2 except that the equivalent ratio (NH$_2$/NCO) was 1.1.

Physical properties at room temperature of said specimen are shown in Table 2.

It is clear from Table 2 that SR under wet conditions, tear energy (Γ) and stress concentration factor (mγ) of the specimen prepared by Example 3 are better than those of the Samples of Comparative Examples 2 and 3 which have the same main chain structure as that of Example 3.

EXAMPLE 4

100 parts of prepolymer, in which main chain structure was polyoxy tetramethylene glycol having a number average molecular weight of 3560 and the terminal groups were tolylene diisocyanate groups, a mixture of divinyl benzene and ethylvinyl benzene (60 : 40) and 0.24 parts of 1,1'-bis-t-butylperoxy-3,3,5-trimethylcyclohexane were mixed and defoamed with stirring at 60° C.

Then, MOCA in a melted state was mixed with said mixture at the equivalent ratio NH$_2$/NCO of 1.1. The resulting composition was casted into a slab mold and cured at 100° C for 3 hours to obtain an elastomeric specimen.

The physical properties at room temperature of the specimen are shown in Table 3.

COMPARATIVE EXAMPLE 4

100 parts of prepolymer, in which the main chain structure was polyoxy tetramethylene glycol having a number average molecular weight of 3788 and the terminal groups were tolylene diisocyanate groups was defoamed with stirring at 60° C, and mixed with MOCA in a melted state at the equivalent ratio (NH$_2$/NCO) of 1.0. The resulting composition was cast into a slab mold and cured at 100° C for 3 hours.

Physical properties of the resulting specimen are shown in Table 3.

Table 3

| Example and Comparative Example | Example Physical properties | Sr under wet conditions | $E_{10}$ (kg/cm$^2$) | Tb (kg/cm$^2$) | Eb (%) | Γ (kg/cm) | mγ (1/cm) | Δε (%) |
|---|---|---|---|---|---|---|---|---|
| Example 4 | | 75 | 128 | 275 | 708 | 46 | 8 | 19.9 |
| Comparative Example 4 | | 51 | 101 | 177 | 668 | 23 | 16 | 39.7 |

From the result shown in Table 4, it is concluded that SR under wet conditions, tear energy and creep are improved as compared with those of Comparative Example 4.

Table 2

| Example and Comparative Example | Physical properties | SR under wet conditions | $E_{10}$ (kg/cm$^2$) | Tb (kg/cm$^2$) | EB (%) | Γ (kg/cm) | mγ (1/cm) | Δε (%) |
|---|---|---|---|---|---|---|---|---|
| Example 3 | | 78 | 341 | 351 | 552 | 75 | 11 | 1.0 |
| Comparative Example 2 | | 64 | 348 | 434 | 462 | 32 | 29 | 1.0 |
| Comparative Example 3 | | 72 | 341 | 286 | 625 | 68 | 14 | 1.2 |

EXAMPLE 5

An elastomeric specimen was prepared by repeating the procedure of Example 2 except that the equivalent ratio NH$_2$/NCO was 0.9 and curing was effected at 120° C for 3 hours.

The SR under wet conditions of the resulting specimen is shown on Table 4 and the other physical properties are in the same level as those of Example 2.

EXAMPLE 6

An elastomeric specimen was prepared by repeating the procedure of Example 2 exceptthat 27.8 parts of the mixture of divinyl benzene and ethylvinyl benzene (60 : 40) and 0.14 parts of 1,1'-bis-t-butylperoxy-3,3,5-trimethylcyclohexane were used.

The SR under wet conditions of the resulting specimen is shown in Table 4 and the other physical properties are in the same levels as those of Example 2.

EXAMPLE 7

An elastomeric specimen was prepared by repeating the procedure of Example 2 except that 19.6 parts of the mixture of divinyl benzene and ethylvinyl benzene (60 : 40), 0.26 parts of 1,1'-bis-t-butylperoxy-3,3,5-trimethylcyclohexane and 0.2 parts of azelaic acid were used.

The SR under wet conditions of the resulting specimen is shown in Table 4 and the other physical properties are in the same levels as those of Example 2.

EXAMPLE 8

An elastomeric specimen was prepared by repeating the procedure of Example 7 except that azelaic acid was not used.

The SR under wet conditions of the resulting specimen is shown at Table 4 and the other physical properties are in the same levels as those of Example 2.

Table 4

| Example or Comparative Example | SR under wet conditions |
| --- | --- |
| Example 5 | 83 |
| Example 6 | 83 |
| Example 7 | 86 |
| Example 8 | 83 |
| Comparative Example 1 | 75 |

EXAMPLE 9

100 parts of prepolymer, in which the main chain structure was polyoxy tetramethylene glycol having a number average molecular weight of 2070 and the terminal groups were tolylene diisocyanate groups, 12.7 parts of a mixture of methylmethacrylate and 3,9-divinyl-2,4,8,10-tetraoxaspiro[5.5]undecane (49 : 51) and 0.25 parts of t-butylperoxy-2-ethylhexanoate were mixed, defoamed with stirring at 60° C and mixed with MOCA at the equivalent ratio (NH$_2$/NCO) of 1.1. The resulting composition was cast into a slab mold and cured at 100° C for 3 hours.

The SR under wet conditions of the resulting specimen is shown at Table 5 and the other physical properties are in the same levels as those of Example 3.

EXAMPLE 10

An elastomeric specimen was prepared by repeating the procedure of Example 9 except that a mixture of methyl methacrylate and ethylene glycol dimethacrylate (50 : 50) was used instead of the mixture of methyl methacrylate and 3,9-divinyl-2,4,8,10-tetraoxaspiro[5,5]undecane.

The SR under wet conditions of the resulting specimen is shown in Table 5 and the other physical properties are at the same levels as those of Example 3.

EXAMPLE 11

An elastomeric specimen was prepared by repeating the procedure of Example 10 except that 12.7 parts of a mixture of methyl methacrylate and 1,3-butylene dimethacrylate (47 : 53) was used instead of the mixture of methyl methacrylate and ethylene glycol dimethacrylate.

The SR under wet conditions is shown in Table 5 and the other physical properties are at the same levels as those of Example 3.

EXAMPLE 12

An elastomeric specimen was prepared by repeating the procedure of Example 11 except that 12.7 parts of a mixture of methyl methacrylate and triallylcyanurate (54 : 46) was used instead of a mixture of methyl methacrylate and ethylene glycol dimethacrylate.

The SR under wet conditions is shown in Table 5 and the other physical properties are at the same levels as those of Example 3.

EXAMPLE 13

An elastomeric specimen was prepared by repeating the procedure of Example 12 except that 12.7 parts of a mixture of cyclohexyl methacrylate, divinyl benzene and ethyl vinyl benzene (72 : 17 : 11) was used instead of a mixture of methyl methacrylate and triallyl cyanurate.

The SR under wet conditions is shown in Table 5 and the other physical properties are at the same levels as those of Example 3.

EXAMPLE 14

An elastomeric specimen was prepared by repeating the procedure of Example 12 except that 12.7 parts of a mixture of butyl methacrylate, divinyl benzene and ethyl vinyl benzene (69 : 19 : 12) was used instead of a mixture of methyl methacrylate and triallyl cyanurate.

The SR under wet conditions is shown in Table 5 and the other physical properties are at the same levels as those of Example 3.

Table 5

| Example or Comparative Example | SR under wet conditions |
| --- | --- |
| Example 9 | 75 |
| Example 10 | 75 |
| Example 11 | 74 |
| Example 12 | 78 |
| Example 13 | 75 |
| Example 14 | 75 |
| Comparative Example 2 | 64 |

EXAMPLE 15

100 parts of prepolymer, in which main chain structure was polyethylene adipate having a number average molecular weight of 2330 and the terminal groups were tolylene diisocyanate groups, 12.4 parts of a mixture of divinyl benzene and ethyl vinyl benzene (60 : 40) and 0.24 parts of t-butyl peroxybenzoate were mixed and defoamed under mixing at 60° C. Then, a mixture of MOCA with 2-hydroxyethyl methacrylate was added thereto and the resulting mixture was cast into a slab mold. In this case, the equivalent ratio of MOCA to prepolymer ($NH_2/NCO$) was 1.1 and the equivalent ratio of MOCA to 2-hydroxyethyl methacrylate ($NH_2/OH$) was 11.0. The curing was carried out at 100° C for 2 hours and further continued at 140° C for 1 hour. The physical properties at room temperature and creep at 100° C of the resulting specimen are shown in Table 6.

Comparative Example 5 peroxy benzoate were mixed and defoamed with stirring at 60° C. Then, MOCA in a melted state was mixed therewith at the equivalent ratio ($NH_2/NCO$) of 1.1 and then 2-hydroxyethyl methacrylate was added to said mixture at the equivalent ratio ($NH_2/NCO$) of 11.0.

The resulting mixture was cast into a slab mold and cured at 100° C for 2 hours and then at 140° C for 1 hour. The physical properties at room temperature and creep at 100° C of the elastomeric specimen obtained are shown in Table 7 in comparison with Comparative Examples 2 and 3.

Table 7

| Example or Comparative Example | Physical properties | SR under wet conditions | $E_{10}$ (kg/cm$^2$) | Tb (kg/cm$^2$) | Eb (%) | Γ (kg/cm) | mγ (1/cm) | Δε (%) |
|---|---|---|---|---|---|---|---|---|
| Example 16 | | 75 | 307 | 308 | 533 | 43 | 24 | 0.5 |
| Comparative Example 3 | | 72 | 341 | 286 | 625 | 68 | 14 | 1.2 |
| Comparative Example 2 | | 64 | 348 | 434 | 462 | 32 | 29 | 1.0 |

The same kind of prepolymer used in Example 15 was reacted with MOCA at the equivalent ratio ($NH_2/NCO$) of 1.1 under the same condition. They physical properties at room temperature and creep at 100° C are shown in Table 6.

Comparative Example 6

An elastomeric specimen was prepared by repeating the procedure of Comparative Example 5 except that the equivalent ratio of MOCA to isocyanate group of prepolymer ($NH_2/NCO$) was 0.9.

The physical properties at room temperature and creep at 100° C are shown in Table 6.

The specimen obtained by Example 16 was superior in SR under wet conditions, creep (Δε) and tensile strength at break (Tb) to that obtained by Comparative Examples 2 and 3 which had the same main chain structure as that of Example 16.

Also, the specimen obtained by Example 16 was superior in creep (Δε) and tear energy (Γ) to the specimen obtained by Example 2 which was taken as the best one of ordinary polyurethane elastomers, which was prepared by using MOCA at the equivalent ratio ($NH_2/NCO$) of 1.0.

EXAMPLE 17

Table 6

| Example or Comparative Example | Physical properties $NH_2/NCO$ (equivalent ratio) | SR under wet conditions | $E_{10}$ (kg/cm$^2$) | Tb (kg/cm$^2$) | Eb (%) | Γ (kg/cm) | mγ (1/cm) | Δε (%) |
|---|---|---|---|---|---|---|---|---|
| Example 15 | 1.1 | 80 | 331 | 341 | 488 | 49 | 14 | 3.1 |
| Comparative Example 5 | 1.1 | 74 | 232 | 390 | 776 | — | — | 5.8 |
| Comparative Example 1 | 1.0 | 75 | 241 | 361 | 671 | — | — | 7.0 |
| Comparative Example 6 | 0.9 | 75 | 244 | 475 | 575 | 39 | 21 | 2.1 |

From the results shown in Table 6, it is clear that the specimen obtained by the present invention is better both in SR under wet conditions and in creep (Δε) than those of ordinary polyesterurethane obtained by various equivalent ratio ($NH_2/NCO$) (Comparative Examples 5, 1 and 6).

The other physical properties of the specimen obtained by Example 15 were comparable to those of the specimens obtained by comparative Examples 5, 1 and 6.

Example 16

100 parts of prepolymer, in which main chain structure was polyoxy tetramethylene glycol having a number average molecular weight of 2070 and the terminal groups were tolylene diisocyanate groups, 12.7 parts of a mixture of divinyl benzene, ethyl vinyl benzene and vinyl acetate (35.8 : 24.4 : 39.8) and 0.25 parts of t-butyl 100 parts of prepolymer, in which main chain structure was polyoxy tetramethylene glycol having a number average molecular weight of 3560 and the terminal groups were tolylene diisocyanate groups, 12.0 parts of a mixture of divinyl benzene and ethyl vinyl benzene (60 : 40) and 0.24 parts of t-butyl peroxybenzoate were mixed and defoamed under mixing at 60° C. Then, MOCA in a melted state was added thereto to the extent of the equivalent ratio ($NH_2/NCO$) of 1.1 and further 2-hydroxyethyl methacrylate was added to said mixture to the extent of the equivalent ratio ($NH_2/OH$) of 11.0.

After mixing and defoaming for several minutes, said mixture was cast into a slab mold, cured at 100° C for 2 hours and further at 140° C for 1 hour.

Physical properties at room temperature and creep at 100° C of the resulting elastomeric specimen are shown in Table 8.

Table 8

| Example or Comparative Example | Physical properties | SR at wet condition | $E_{10}$ (kg/cm$^2$) | Tb (kg/cm$^2$) | Eb (%) | Γ (kg/cm) | mγ (1/cm) | Δε (%) |
|---|---|---|---|---|---|---|---|---|
| Example 17 | | 82 | 129 | 244 | 650 | 36 | 12 | 16.0 |
| Comparative Example 4 | | 51 | 101 | 177 | 668 | 23 | 16 | 39.7 |

SR under wet conditions, creep and the other physical properties of the specimen obtained by Example 17 were superior to those of the specimen obtained by Comparative Example 4. Furthermore, it is considered that effects of the present invention are maintained regardless of molecular weight of the prepolymer.

EXAMPLES 18 – 22

100 parts of prepolymer, in which main chain structure was polyoxy tetramethylene glycol having a number average molecular weight of 2070 and the terminal groups were tolylene diisocyanate groups, the same amount of radical initiator polymerizable vinyl monomer and the same amount of radical initiator which were shown in Table 9 were mixed and defoamed with stirring at 60° C. Then, MOCA in a melted state was added thereto to the extent of the equivalent ratio $NH_2/NCO$ of 1.1 and 2-hydroxylethyl methacrylate was mixed with to the extent of the equivalent ratio $(NH_2/OH)$ of 11.0. The resulting mixture was defoamed with stirring, casted into a slab mold and cured at a temperature for a period of time as shown in Table 9.

The values of SR under wet conditions of the resulting specimens are shown in Table 9 in comparison with that of the specimen obtained by Comparative Example 2.

Table 9

| Example or Comparative Example | Vinyl Monomers | | Radical Initiation | | Cure condition | | SR under wet conditions |
|---|---|---|---|---|---|---|---|
| | Kinds | Weight ratio | Kinds | Weight parts | Temperature (° C) | Time (hr.) | |
| Example 18 | divinyl/ethylvinyl/methyl benzene/benzene/methacrylate | 35.8/24.4/39.8 | t-butyl peroxy-benzoate | 0.25 | 100 / 140 | 2 / 1 | 74 |
| Example 19 | divinyl/ethylvinyl/acrylo-benzene/benzene/nitrile | 35.8/24.4/39.8 | 1,1'-bis-t-butyl peroxy 3,3,5-trimethyl cyclohexane | 0.25 | 100 | 3 | 76 |
| Example 20 | divinyl/ethylvinyl benzene/benzene | 60/40 | t-butyl peroxy benzoate | 0.25 | 100 / 140 | 2 / 1 | 76 |
| Example 21 | divinyl/ethylvinyl benzene/benzene/methacrylate | 23.7/15.8/60.5 | " | 0.25 | 100 / 140 | 2 / 1 | 75 |
| Example 22 | divinyl/ethylvinyl benzene/benzene | 60/40 | t-butyl peroxy 2-ethyl hexanoate | 0.35 | 100 | 3 | 76 |
| Comparative Example 2 | — | — | — | — | 100 | 3 | 64 |

EXAMPLE 23

An elastomeric specimen was prepared by repeating the same procedure as shown in Example 20 except that the prepolymer, which main chain structure was polyoxy tetramethylene glycol having a number average molecular weight of 2926 and the terminal groups being tolylene diisocyanate groups was used.

The value of SR under wet conditions was 86.

We claim:

1. A polyurethane composition produced by mixing
   (a) 100 parts by weight of prepolymer selected from the group consisting of polyether, polyester, and polyunsaturated hydrocarbon, the prepolymer having terminal isocyanate groups and having number average molecular weight in the range of from 800 to 20,000,
   (b) 5 – 30 parts by weight of a radical polymerizable vinyl compound or a mixture thereof, and
   (c) 0.05 – 1.0 part by weight of a radical initiator selected from the group consisting of 1,1'-bis-t-butyl peroxy-3,3,5-trimethylcyclohexane, benzoyl peroxide, t-butyl peroxybenzoate, t-butyl peroxy-2-ethylhexanoate, lauroyl peroxide, azo-bis-isobutyronitrile, decanoyl peroxide, propionyl peroxide, succinic acid peroxide, acetyl peroxide, t-butyl peroxyisobutyrate, t-butyl peroxymaleic acid, t-butyl peroxylaurate, cyclohexanone peroxide, t-butyl peroxyisopropyl carbonate, 2,5-dimethyl-2,5-di(2-ethylhexylperoxy) hexane, t-butyl peroxyacetate and mixtures thereof;

adding (d) a curative selected from the group consisting of polyamine and polyol; and curing the resulting mixture by heating at 70° – 140° C to produce an elastomeric polyurethane, the equivalent ratio of the active hydrogen of (d) to the isocyanate groups of (a) being in the range of from 0.8 to 1.2.

2. The polyurethane composition according to claim 1 in which the prepolymer in (a) is selected from the class of prepolymers having a polyethylene adipate main chain and having terminal tolylene diisocyanate groups, prepolymers having a polyoxytetramethylene glycol main chain and having terminal tolylene diisocyanate groups, and prepolymers having a polyoxypropylene glycol main chain and having terminal tolylene diisocyanate groups.

3. The polyurethane composition according to claim 1 in which the radical polymerizable vinyl compound in (b) is an aromatic vinyl compound.

4. The polyurethane composition according to claim 3 in which the aromatic vinyl compound is selected from the class of divinyl benzene and ethyl vinyl benzene.

5. The polyurethane composition according to claim 3 in which the radical polymerizable vinyl compound in (b) is selected from the class of methyl methacrylate, vinyl acetate, ethylene glycol dimethacrylate, 1,3-butylene dimethacrylate, 3,9-divinyl-2,4,8,10-tetraoxaspiro [5,5]undecane and mixtures thereof.

6. The polyurethane composition according to claim 1 in which the radical initiator in (c) is selected from the class of t-butyl peroxy benzoate, t-butyl peroxy-2-ethyl hexanoate, and 1,1'-bis-t-butyl peroxy-3,3,5-trimethylcyclohexane.

7. The polyurethane composition according to claim 1 in which the polyamine in (d) is an aromatic polyamine.

8. The polyurethane composition according to claim 7 in which the aromatic polyamine is selected from the class of methylene-bis-ortho-chloroaniline, methylene dianiline, naphthalene-1,5-diamine, phenylene diamine, tolylene-2,4-diamine, diphenyl ether-4,4'-diamine, 2,6-dichlorophenylene diamine, and compounds of the formulas

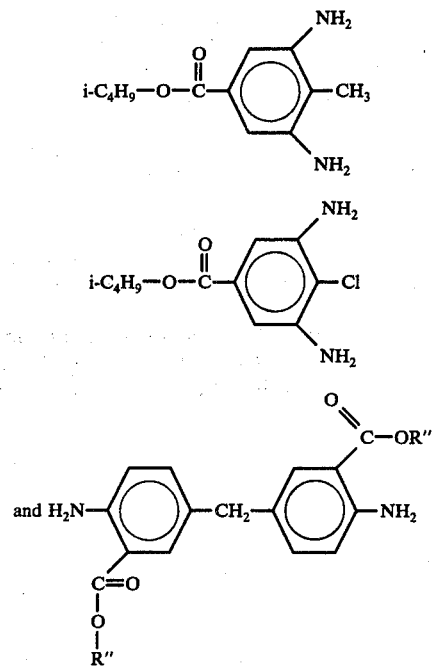

wherein R" is, similar or dissimilar, selected from the class of —CH$_3$, —C$_2$H$_5$, —C$_3$H$_7$ and —C$_4$H$_9$.

9. The polyurethane composition according to claim 1 in which the polyamine in (d) is hydrazine, ethylenediamine, and hexamethylene-1,6-diamine.

10. The polyurethane composition according to claim 1 in which the polyol in (d) is ethylene glycol, 1,3-propylene glycol, 1,4-butane diol, trimethylol propane, and a compound of the formula

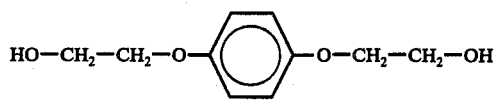

and their mixture.

11. A polyurethane composition produced by mixing
(a) 100 parts by weight of prepolymer selected from the group consisting of polyether, polyester, and polyunsaturated hydrocarbon, the prepolymer having terminal isocyanate groups and having number average molecular weight in the range of from 800 to 20,000,
(b) 5-30 parts by weight of a radical polymerizable vinyl compound or a mixture thereof, and
(c) 0.05 - 1.0 part by weight of a radical initiator selected from the group consisting of 1,1'-bis-t-butyl peroxy-3,3,5-trimethylcyclohexane, benzoyl peroxide, t-butyl peroxybenzoate, t-butyl peroxy-2-ethylhexanoate, lauroyl peroxide, azo-bis-isobutyronitrile, decanoyl peroxide, propionyl peroxide, succinic acid peroxide, acetyl peroxide, 5-butyl peroxyisobutyrate, t-butyl peroxymaleic acid, t-butyl peroxylaurate, cyclohexanone peroxide, t-butyl peroxyisopropyl carbonate, 2,5-dimethyl-2,5-di(2-ethylhexylperoxy) hexane, t-butyl peroxyacetate and mixtures thereof; adding (d) a curative selected from the group consisting of polyamine and polyol, and
(e) less than 1.0 part by weight of an accelerator of chain extending reaction; and
curing the resulting mixture by heating at 80° - 140° C to produce an elastomeric polyurethane, the equivalent ratio of the active hydrogen of (d) to the isocyanate groups of (a) being in the range of from 0.8 to 1.2.

12. The polyurethane composition according to claim 11 in which the accelerator of chain extending reaction in (e) is selected from the class of 2-methyl benzoic acid, 3-methyl benzoic acid, 4-methyl benzoic acid, 3,5-dimethyl benzoic acid, 2-ethoxy benzoic acid, 3,4,5-trimethyl benzoic acid and azelaic acid.

13. A polyurethane composition produced by mixing
(a) 100 parts by weight of prepolymer selected from the group consisting of polyether, polyester, and polyunsaturated hydrocarbon, the prepolymer having terminal isocyanate groups and having number average molecular weight in the range of from 800 to 20,000,
(b) 5 - 30 parts by weight of a radical polymerizable vinyl compound or a mixture thereof, and
(c) 0.05 - 1.0 part by weight of a radical initiator selected from the group consisting of 1,1'-bis-t-butyl peroxy-3,3,5-trimethylcyclohexane, benzoyl peroxide, t-butyl peroxybenzoate, t-butyl peroxy-2-ethylhexanoate, lauroyl peroxide, azo-bis-isobutyronitrile, decanoyl peroxide, propionyl peroxide, succinic acid peroxide, acetyl peroxide, t-butyl peroxyisobutyrate, t-butyl peroxymaleic acid, t-butyl peroxylaurate, cyclohexanone peroxide, t-butyl peroxyisopropyl carbonate, 2,5-dimethyl-2,5-di(ethylhexylperoxy) hexane, t-butyl peroxyacetate and mixtures thereof;
adding (d) a curative selected from the group consisting of polyamine and polyol, and
(f) a compound having both a vinyl group and functional group containing an active hydrogen; and
curing the resulting mixture by heating at 70 - 140° C to produce an elastomeric polyurethane, the equivalent ratio of the total active hydrogen of (d) and (f) to the isocyanate groups of (a) being in the range of from 0.8 to 1.2 and the equivalent ratio of the active hydrogen of (d) to that of (f) being in the range of from 3 to 25.

14. The polyurethane composition according to claim 13 in which the compound having both a vinyl group and a functional group containing an active hydrogen in (f) is selected from the class of 2-hydroxyethyl methacrylate, 2-hydroxypropyl methacrylate, aminostyrene, p-vinylbenzyl alcohol, hydroxystyrene, N-methylol acrylamide and methacrylic acid.

15. A polyurethane composition produced by mixing
   (a) 100 parts by weight of prepolymer selected from the group consisting of polyether, polyester, and polyunsaturated hydrocarbon, the prepolymer having terminal isocyanate groups and having number average molecular weight in the range of from 800 to 20,000,
   (b) 5 – 30 parts by weight of a radical polymerizable vinyl compound or a mixture thereof, and
   (c) 0.05 – 1.0 parts by weight of a radical initiator selected from the group consisting of 1,1'-bis-t-butyl peroxy-3,3,5-trimethylcyclohexane, benzoyl peroxide, t-butyl peroxybenzoate, t-butyl peroxy-2-ethylhexanoate, lauroyl peroxide, azo-bisisobutyronitrile, decanoyl peroxide, propionyl peroxide, succinic acid peroxide, acetyl peroxide, t-butyl peroxyisobutyrate, t-butyl peroxymaleic acid, t-butyl peroxylaurate, cyclohexanone peroxide, t-butyl peroxyisopropyl carbonate, 2,5-dimethyl-2,5-di(ethylhexylperoxy) hexane, t-butyl peroxyacetate and mixtures thereof;
   adding (d) a curative selected from the group consisting of polyamine and polyol,
   (e) less than 1.0 parts by weight of an accelerator of chain extending reaction, and
   (f) a compound having both a vinyl group and a functional group containing active hydrogen; and
   curing the resulting mixture by heating at 70° - 140° C to produce an elastomeric polyurethane, the equivalent ratio of the total active hydrogen of (d) and (f) to the isocyanate groups of (a) being in the range of from 0.8 to 1.2 and the equivalent ratio of the active hydrogen of (d) to that of (f) being in the range of from 3 to 25.

16. The polyurethane composition according to claim 15 in which the accelerator of chain extending reaction in (e) is selected from the class of 2-methyl benzoic acid, 3-methyl benzoic acid, 4-methyl benzoic acid, 3,5-dimethyl benzoic acid, 2-ethoxy benzoic acid, 3,4,5-trimethyl benzoic acid and azelaic acid, and the compound having both a vinyl group and a functional group containing an active hydrogen in (f) is selected from the class of 2-hydroxyethyl methacrylate, 2-hydroxypropyl methacrylate, aminostyrene, p-vinylbenzyl alcohol, hydroxystyrene, N-methylol acrylamide and methacrylic acid.

17. A polyurethane composition produced by mixing 100 parts by weight of a prepolymer having a polyoxytetramethylene glycol main chain and having terminal tolylene diisocyanate groups and having number average molecular weight in the range of from 2,000 to 5,000, 5 – 30 parts by weight of a mixture of divinyl benzene and ethyl vinyl benzene, and 0.05 – 1.0 part by weight of t-butyl peroxybenzoate, adding methylene bis-orthochloroaniline, and curing the resulting mixture by heating at 70° – 140° C, the equivalent ratio of the active hydrogen of methylene bis-orthochloroaniline to the isocyanate group of the prepolymer ranging from 0.8 to 1.2.

* * * * *